United States Patent
Greve

(10) Patent No.: US 8,991,617 B2
(45) Date of Patent: Mar. 31, 2015

(54) FEED TROUGH FOR A PROCESSING APPARATUS

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/916,202

(22) Filed: Jun. 12, 2013

(65) Prior Publication Data

US 2013/0341257 A1    Dec. 26, 2013

Related U.S. Application Data

(60) Provisional application No. 61/662,458, filed on Jun. 21, 2012.

(51) Int. Cl.

| | |
|---|---|
| B07B 13/00 | (2006.01) |
| B65G 11/02 | (2006.01) |
| B07B 1/14 | (2006.01) |
| B65G 37/00 | (2006.01) |
| B07B 13/07 | (2006.01) |
| B65G 47/24 | (2006.01) |
| A22C 25/00 | (2006.01) |
| A22C 25/04 | (2006.01) |

(52) U.S. Cl.
CPC .............. *B65G 11/023* (2013.01); *B07B 1/145* (2013.01); *B65G 37/00* (2013.01); *B07B 13/072* (2013.01); *B65G 47/24* (2013.01); *A22C 25/003* (2013.01); *A22C 25/04* (2013.01); *B65G 2201/0202* (2013.01)

USPC ................ 209/673; 53/501; 53/537; 414/789

(58) Field of Classification Search
USPC ....................... 209/673; 198/560; 53/501, 537
See application file for complete search history.

(56) References Cited

U.S. PATENT DOCUMENTS

| | | | |
|---|---|---|---|
| 3,108,691 A | 10/1963 | Vance | |
| 3,200,559 A * | 8/1965 | Curtis | ............................. 53/501 |
| 3,534,849 A * | 10/1970 | De Coursey, Jr. et al. | .... 198/560 |
| 3,770,123 A | 11/1973 | Mraz | |
| 4,329,831 A * | 5/1982 | Warkentin et al. | .............. 53/537 |
| 5,634,744 A * | 6/1997 | Ashworth | ........................ 406/85 |
| 6,065,607 A | 5/2000 | Magnusson et al. | |
| 6,321,914 B1 | 11/2001 | Magnusson et al. | |
| 2010/0119347 A1 * | 5/2010 | Malenke et al. | .............. 414/789 |

OTHER PUBLICATIONS

Booman A., and R. P. Singh. A Mechanical Device to Sort Market Squid, *Loligo opalescens*. Marine Fishieries Review 48(2): 37-43, 1986.
Partial European Search Report on European Patent Application No. EP 13 17 2906 dated, Nov. 14, 2013, Munich.

* cited by examiner

*Primary Examiner* — Terrell Matthews
(74) *Attorney, Agent, or Firm* — Catherine M. Bishop

(57) ABSTRACT

A feed trough for a grader or other solid object processing system. The feed trough includes a plurality of feed channels, each having at least one flexible flap extending from a discharge end for transitioning a product from the feed channel to a processing region. Two converging flexible flaps may extend from the discharge end and contact a processing channel for guiding product to the processing channel.

15 Claims, 18 Drawing Sheets

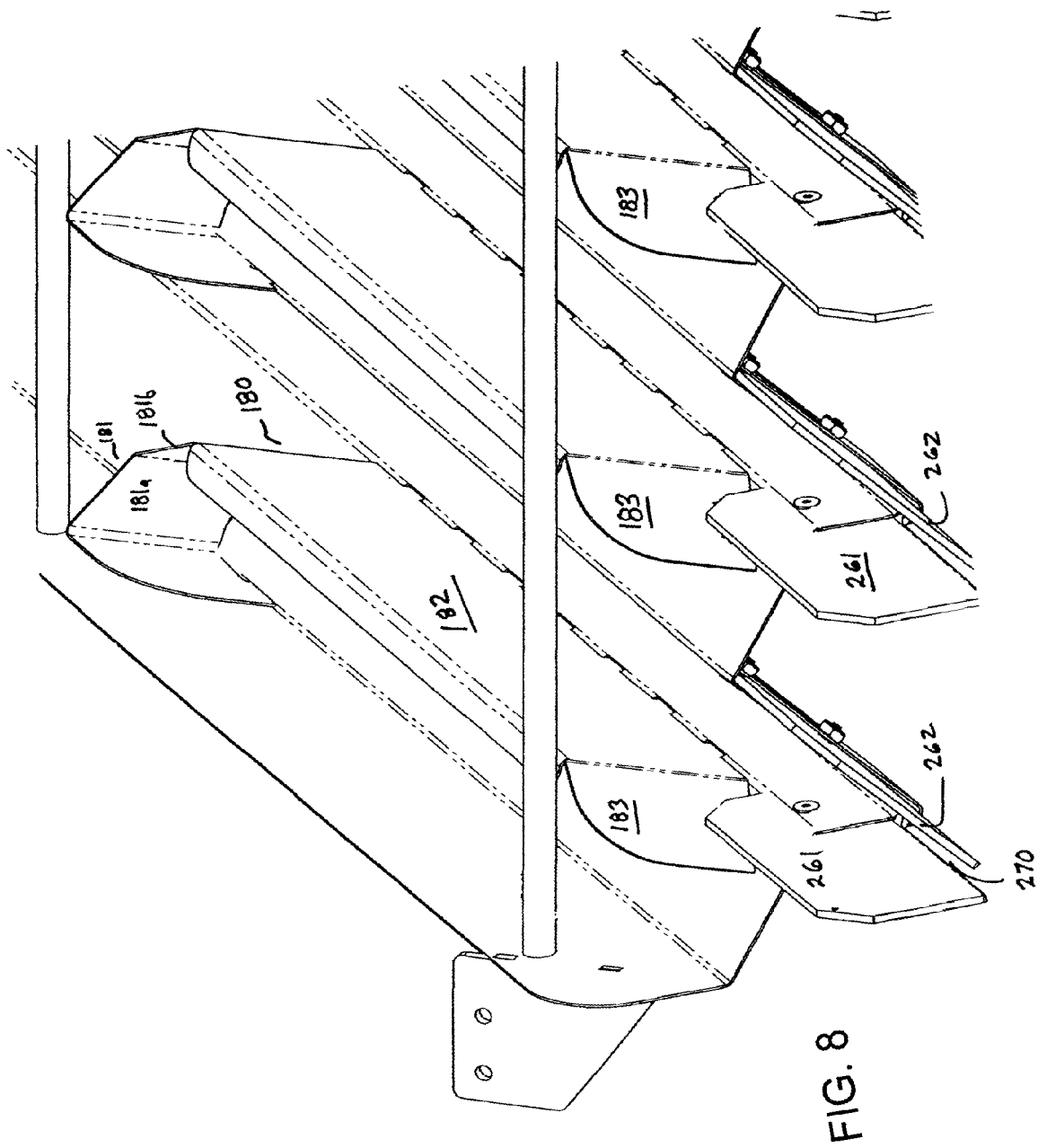

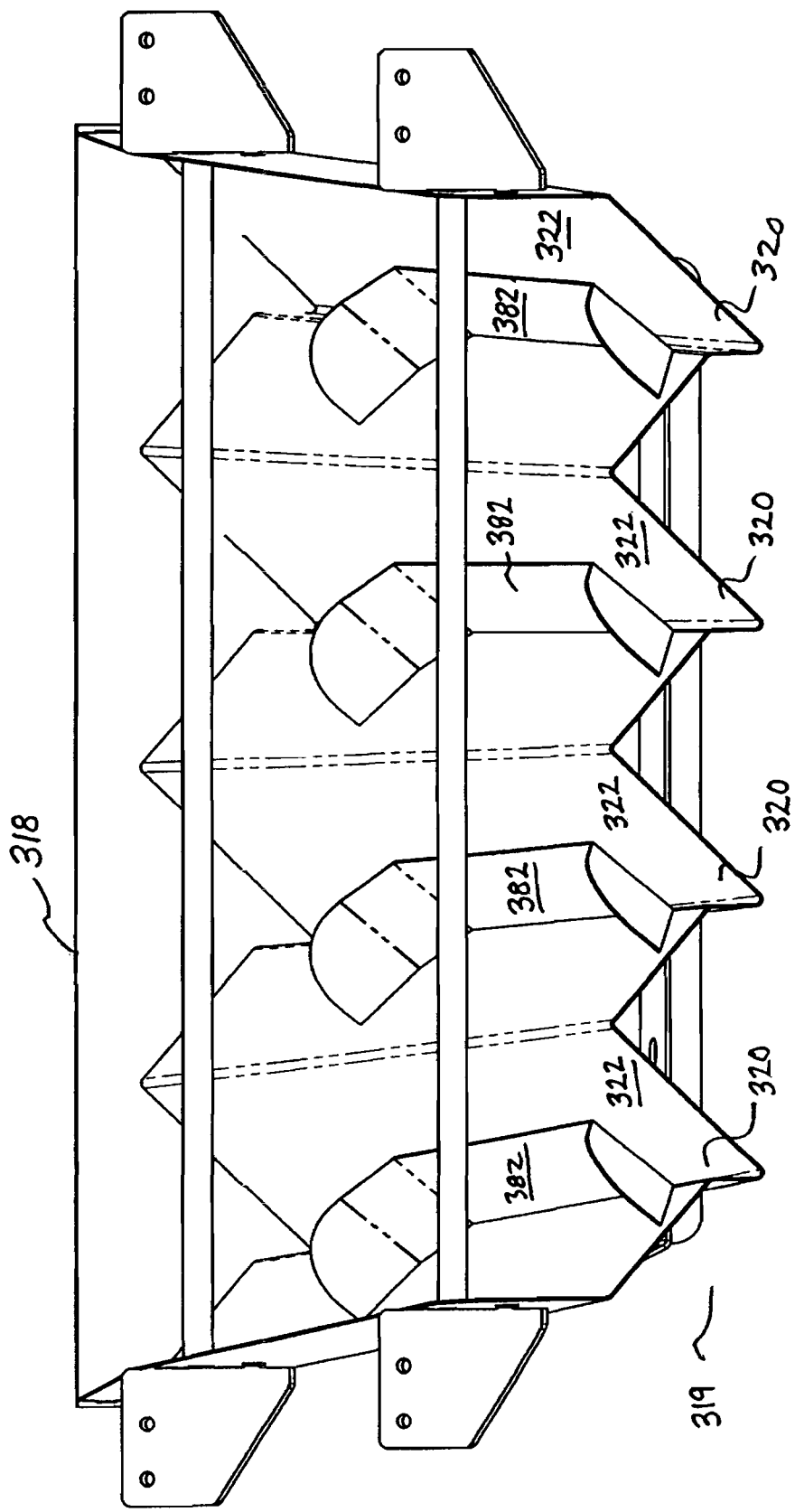

FEED TROUGH FOR A PROCESSING APPARATUS

BACKGROUND

The invention relates generally to apparatus and methods for processing solid objects and, more particularly, to feed troughs for processors.

Processors, such as graders, peelers, cleaners, freezers, coolers, and cookers, may process solid objects in batches. For example, graders may be used to sort objects into different sizes, or grades. Peelers may be used to removes shells or skins from objects. Solid objects that may be processed in batches include food products, such as fruits, vegetables, nuts, shellfish, portions of meat, poultry, and fish, and non-food products, such as ball bearings, castings, and aggregates.

Traditional feed troughs for processors include a plurality of channels for dividing a batch of objects to be separated and feeding the objects to a processing region. Feeding objects to a processing region can be difficult. Delicate objects require gentle handling and other objects may require precise placement and-or orientation in a processing region. For example, hard objects, such as clams and nuts, tend to accumulate energy and bounce when dropped from a feed trough to a processing region. Squid is delicate and generally difficult to feed to a processing region due to the risk of the tentacles snagging. Shrimp may also be difficult to feed to a processing region due to their non-uniform shape.

SUMMARY

The present invention provides an improved feed trough for a processor of solid objects. The feed trough employs a flexible flap extending from the end of a feed channel to facilitate the transfer of solid objects to a processor. In one embodiment, the feed trough comprises a plurality of feed channels for dividing a batch of solid objects into a stream of singulated objects and a plurality of flexible flaps extending from the ends of the feed channels to facilitate transfer of the solid objects to a processor.

According to one aspect of the invention, a feed trough for a processor comprises a base forming a plurality of feed channels, each feed channel extending from a first end to a second end, and a first flexible flap extending from the second end of a feed channel.

According to another aspect of the invention, a processor for solid objects comprises a feed trough and a processing section. The feed trough comprises a plurality of feed channels extending from a first end to a second end and a flexible flap extending from the second end of one of the feed channels. The processing section extends in length from an infeed end to an opposite end and in width from a first side to a second side and includes plurality of processing channels extending from the infeed end to the opposite end. The flexible flap contacts a processing channel at an infeed end.

According to another aspect of the invention, a method of grading squid is provided. The method comprises the steps of providing a batch of squid to a grader, and automatically separating the squid using the grader based on size.

BRIEF DESCRIPTION OF THE DRAWINGS

These features and aspects of the invention, as well as its advantages, are described in more detail in the following description, appended claims, and accompanying drawings, in which:

FIG. 8 is a detailed close up view of a discharge end of the feed trough of FIGS. 7A and 7B;

FIG. 9B is a front view of the feed trough of FIG. 9A;

DETAILED DESCRIPTION

The present invention provides an improved feed trough for feeding solid objects, such as shrimp, squid, clams, fish, chicken, and other food or non-food items, to a processor, such as a grader, peeler, cleaner, cooler, freezer or cooker. The feed trough divides a batch of solid objects into an array of feed channels, singulates the solid objects in each of the feed channels and gently passes the array of singulated solid objects to processing channels in the processor. Flexible flaps extending from the ends of the feed channels facilitate transfer and placement of the solid objects in the processing channels. The feed channels may also orient an object to be processed in a particular orientation and maintain that orientation during transfer to a processing region. The invention will be described relative to certain illustrative embodiments, though those skilled in the art will recognize that the invention is not limited to the illustrative embodiments.

Figure 1:
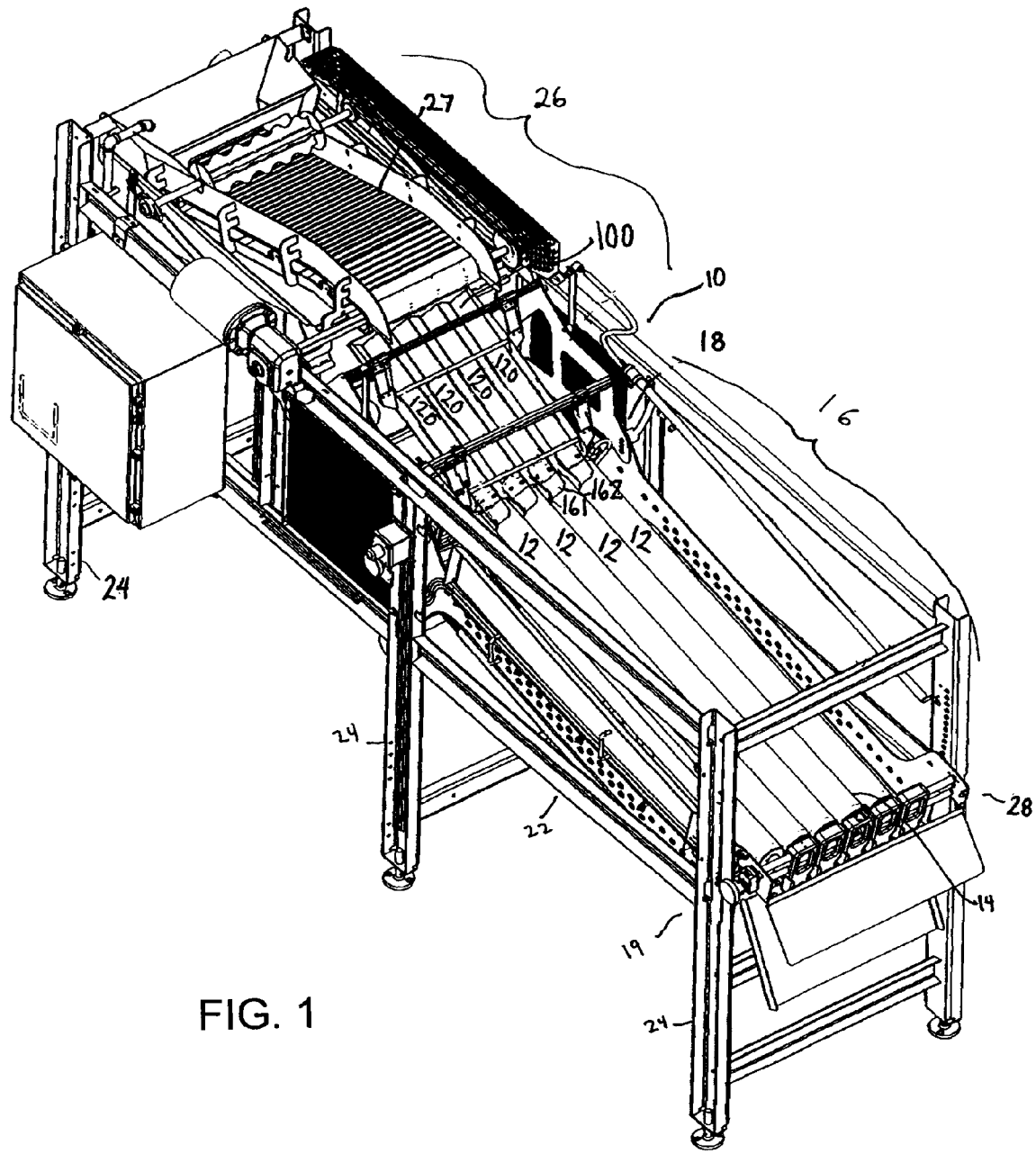
FIG. 1 illustrates a grader with a feed trough having flexible flaps according to an illustrative embodiment of the invention.
Figure 2A:
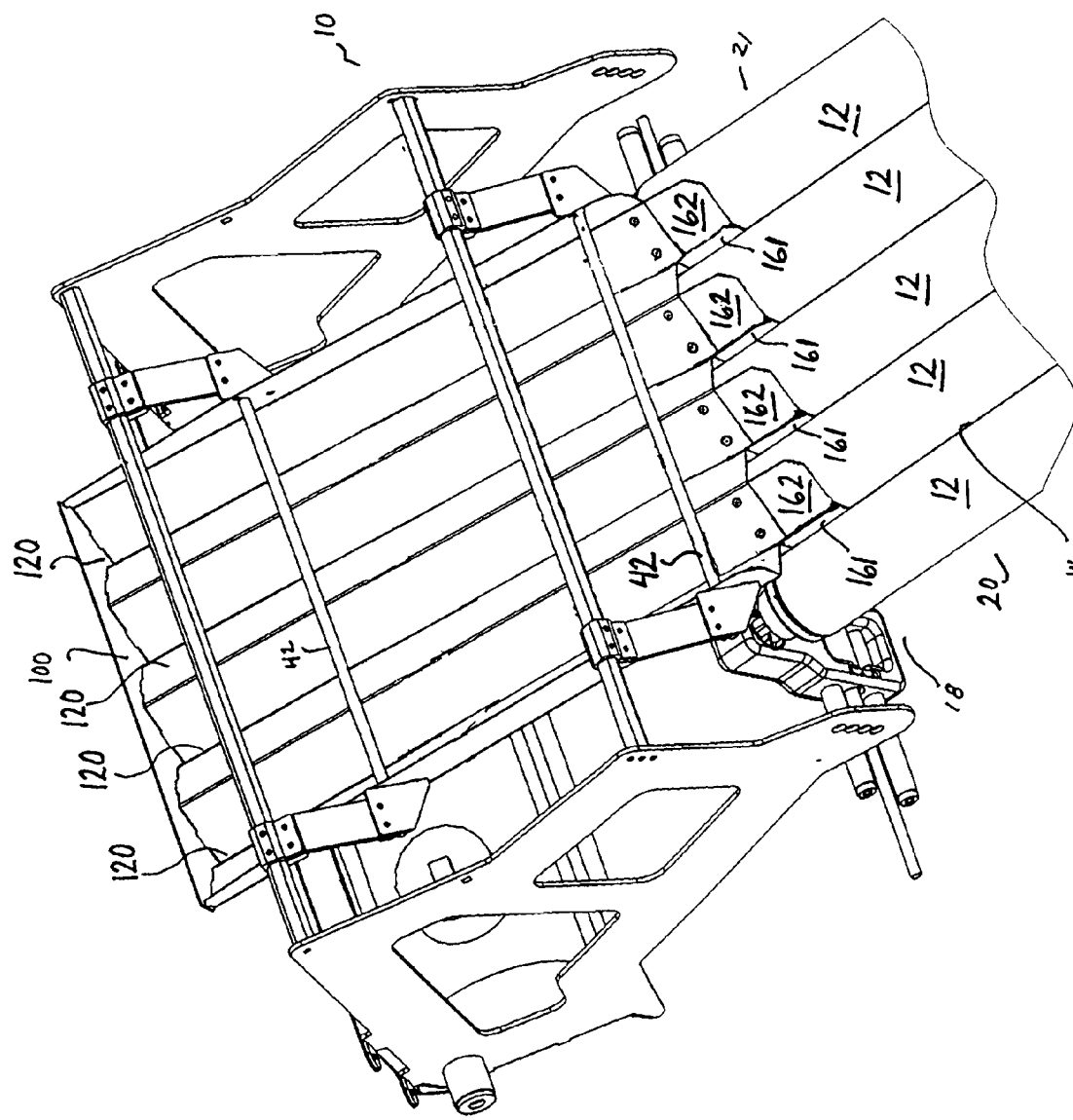
FIG. 2A is a detailed close up view of the grader of FIG. 1 at the infeed section.
Figure 2B:
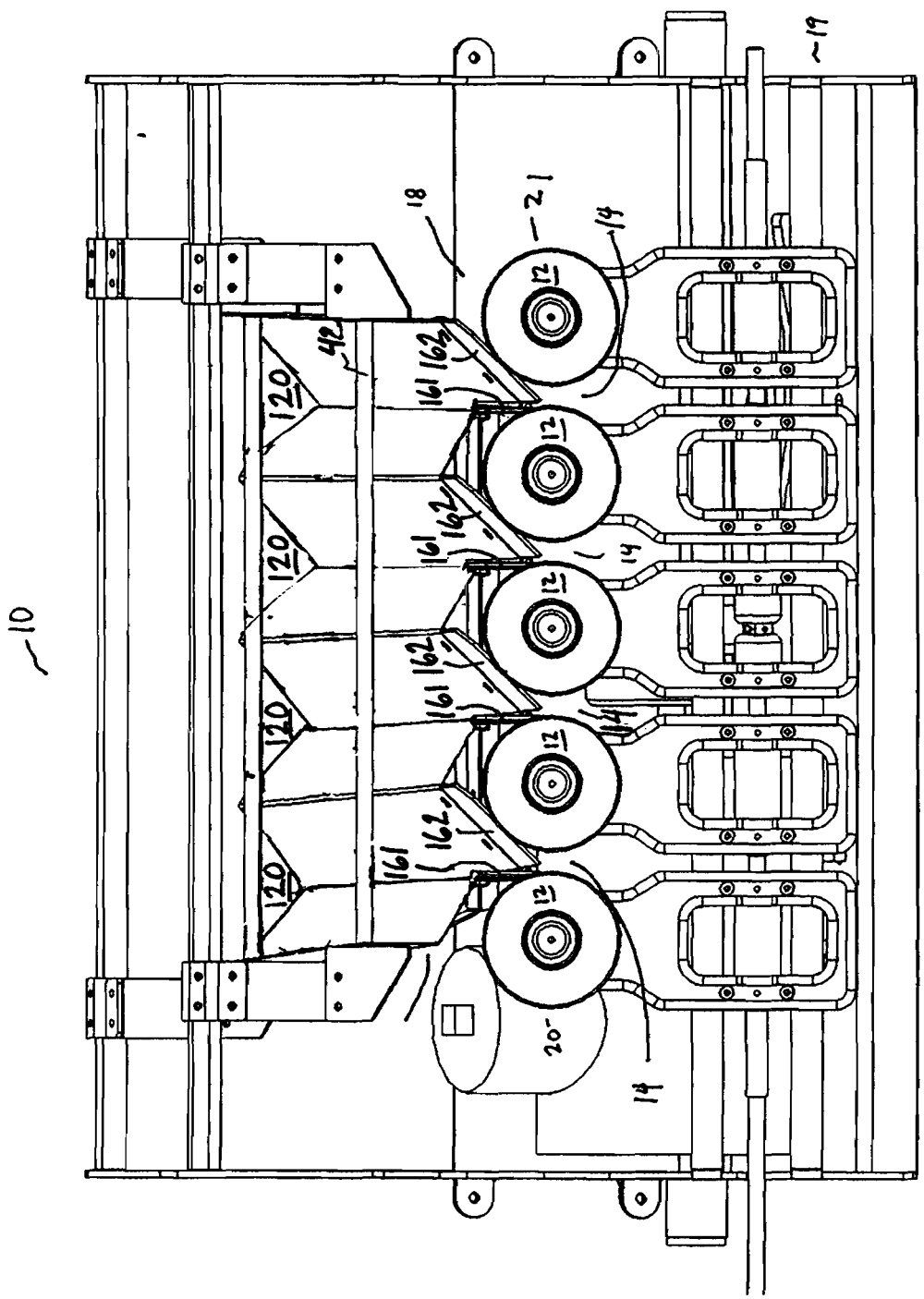
FIG. 2B is a front view of the grader at the infeed section.

FIGS. 1, 2A and 2B illustrate a grader 10 including a feed trough 100 of an illustrative embodiment of the invention. The feed trough 100 may be used with any suitable solid object processor having processing channels and is not limited to use with a grader with grading channels.

The grader 10 includes an infeed section 26, a grading section 16 and an outfeed section 28. The grading section 16 comprises planar array of grading channels, comprising grading rollers 12 separated across gaps 14. In this example, the grading section has five cylindrical rollers, all of the same diameter. But more or fewer rollers could be used to match the throughput requirement. The grading section 16 extends in length in the axial direction of the rollers 12 from an infeed end 18 to an opposite exit end 19 and laterally in width from a first side 20 more or less at the outer side of one of the outermost rollers to a second side 21 at the outer side of the opposite outermost roller. Grading section 16 and all the other components of the grader are supported in a frame 22 having legs 24. An example of a suitable grader is described in U.S. patent application Ser. No. 13/342,266 entitled "Grader," the contents of which are incorporated by reference. Alternatively, the feed trough 100 may be used with another type of grader, such as the grading machines described in U.S. Pat. Nos. 6,065,607 and 6,321,914, or other processor, such as the shrimp peeling systems available from Laitram Machinery of Harahan, La.

The axes of rotation of the rollers diverge from the infeed end 18 to the opposite end 19. The gaps 14 between laterally consecutive rollers 12 form gauging passages that increase in width from a minimum gauge $G_{min}$ at the infeed end 18 to a maximum gauge $G_{max}$ at the opposite exit end 19. In this case, the five grading rollers form four gauging passages. Products fed into the grading section 16 advance along its length in the gaps. When a product advancing along the gap reaches a position along the widening gauging passage at which the passage width exceeds the lateral dimension of the product, the product falls through the passage under the influence of gravity. Thus, smaller products fall closer to the infeed end 18, and larger products, closer to the opposite end 19. Products whose lateral dimensions exceed the maximum gauge $G_{max}$ drop off the exit end 19 of the grader into a chute 28 or other outfeed device for further processing.

Graded products that pass through the gauging passages 14 drop onto one or more collection devices. Suitable collection devices include a conveyor belt disposed below the grading section 16 and running transverse to the length direction of the grading section and collection bins. Other suitable means known in the art for grading or otherwise processing solid objects may be used.

Products to be processed are fed onto a processing section, such as the grading section 16, at its upper infeed end by the feed trough 100, embodiments of which are shown in FIGS. 3-8. The feed trough 100 includes a plurality of flexible flaps at a discharge end to facilitate transfer and placement of the products in the processing section. An infeed conveyor 27 or other infeed device may deliver product to the feed trough 100.

Figure 3:
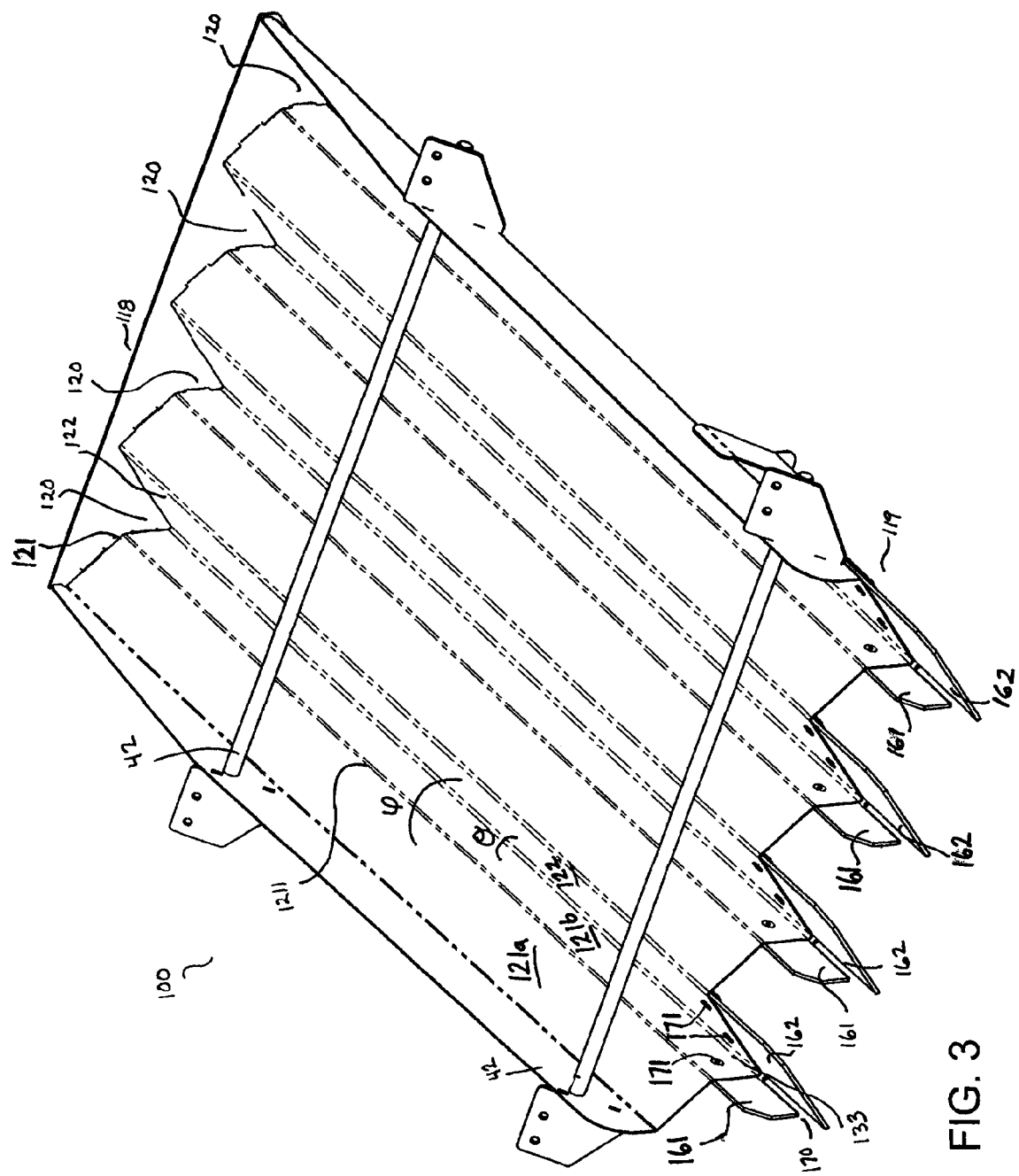
FIG. 3 is an isometric view of a feed trough for a processor including flexible flaps according to one embodiment of the invention.
Figure 4:
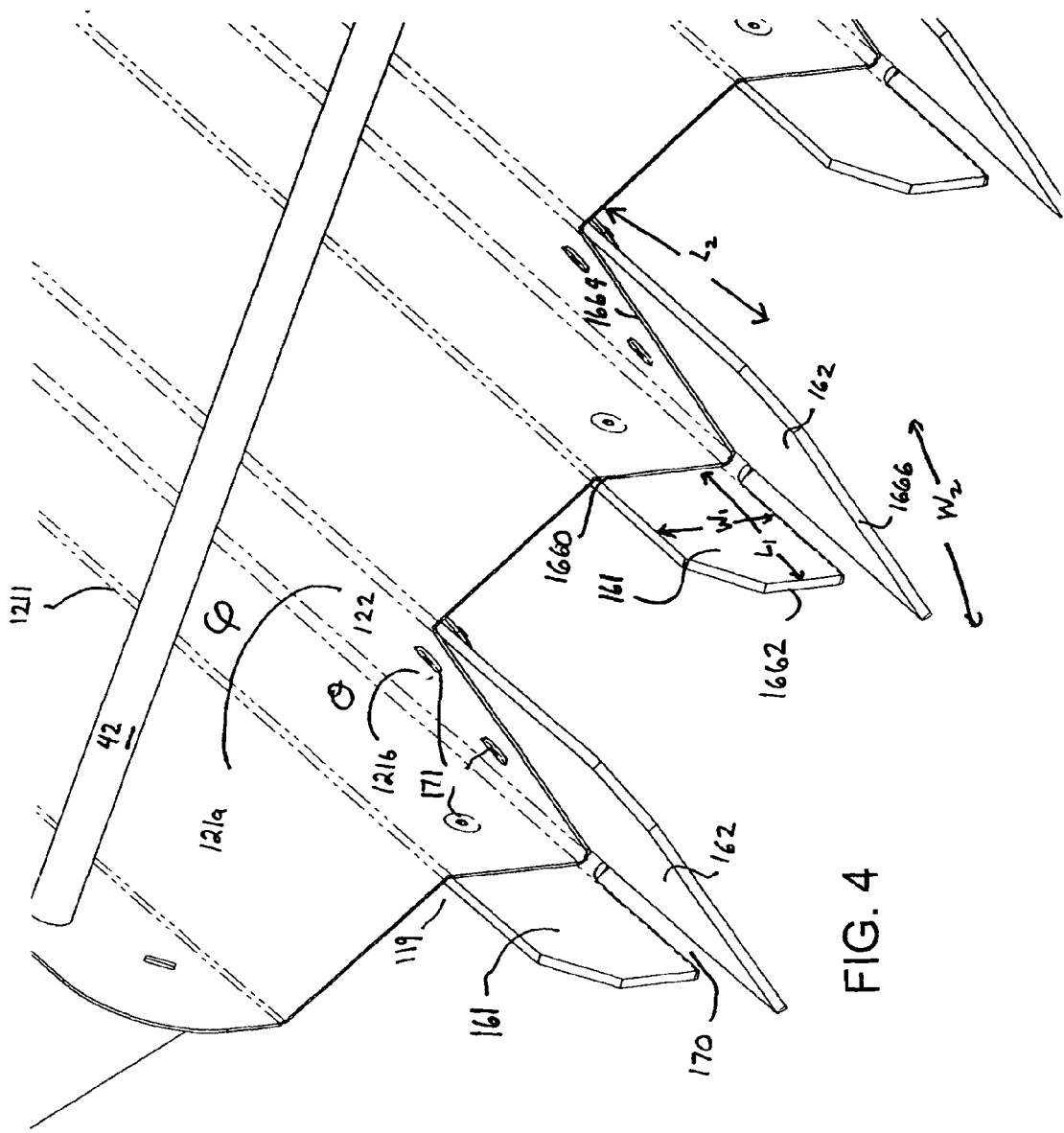
FIG. 4 is a detailed close up view of a discharge end of the feed trough of FIG. 3.

Referring to FIGS. 3 and 4, in one embodiment, the feed trough 100 comprises a corrugated base forming a plurality of feed channels 120 extending from a first end 118 to a second end 119. The first end 118 receives objects from a conveyor, pan, tank or other infeed device. The feed trough disperses the objects into the feed channels 120, which singulate the objects and feed the objects to corresponding processing channels at the discharge end 119. Preferably, the number and spacing of the feed channels in the feed trough at the discharge end 119 correspond to the number and position of the processing channels, such as the gauging passages 14, at the infeed end 18 of the processing section of a corresponding processor.

In the embodiment of FIGS. 3 and 4, each feed channel 120 comprises at least two channel walls 121, 122. The first channel wall 121 includes a bend 1211, while the second channel wall 122 is straight. The walls 121, 122 converge and intersect at an angle θ at the bottom of the feed channel to form a narrow angled slot 133. A top portion 121a of the first channel wall 121 bends away from the bottom portion 121b and meets the top of the second channel wall 122 of the adjacent channel. The plane of the top portion 121a of the first channel wall 121 forms an angle φ with the first channel wall 122. The top channel angle φ is greater than the bottom slot angle θ. Thus, each feed channel 120 has a greater angle between the first and second side walls at the top of the channel than at the bottom. In the illustrative embodiment, the lower portion 121b of the first wall is substantially vertical to facilitate placement of a product in the feed channel 120. This channel configuration is useful in orienting products on edge in the slots rather than resting on their broad sides spanning the first and second sides across the feed channel 120 for better presentation to the processing region.

In the embodiment shown in FIGS. 3 and 4, the feed channels have a consistent cross-section from the first end 118 to the second end 119. Alternatively, the cross-section of the feed channels may vary. For example, the feed trough 100 may be fan-shaped, with the feed channels 120 widening from the first end to the second end. Alternatively, the feed channels 120 may narrow from the first end to the second end. The feed channels 120 may also shift to the right or left in order to place the outlet of each feed channel at the second end 119 at a desired location of a processing region.

In another embodiment, the feed channels 120 have triangular, rectangular, square, trapezoidal, semi-circular or other suitably shaped cross-sections.

While the first end 118 and second end 119 of the illustrative feed channels 120 correspond to the ends of the base of the feed trough, alternatively, the ends of the feed channels may be located at an intermediate portion of the base, or the feed channels 120 may branch within the base.

The feed trough 100 may vibrate to facilitate movement of the product from the first end to the second end. The vibration of the trough and gravity urge the product into the slot 133 at the bottom of the channel. An actuator attached to the feed trough may impart a cyclic upthrusting and translating motion to the feed trough. The actuator may be a crank mechanism having a motor whose shaft rotates a crank arm pivotally connected to one end of a connecting rod whose opposite end is pivotally connected to a block at the bottom of the feed trough 100, imparts a cyclic upthrusting and horizontal translation to the feed trough that impulsively advances products along the feed trough and helps unstack piggy-backed products. The cyclic upthrusting of the feed trough tosses the products upward above the bottoms of the feed channels, while the horizontal translation pulls the feed trough rearward so that the tossed products land farther down the feed channels. The combined motion of the feed trough advances the products along and unstacks piggy-backed products. Alternatively, a linear actuator connected between the grader frame and the bottom of the feed trough could be used. The downward slant of the trough also helps urge products onto the grading section 16 with the aid of gravity. The feed trough 100 may be suspended from a feed framework by four links pivotally attached at both ends by pivot pins.

Height restrictors 42 extending across the width of the feed-trough above the feed channels 120 also serve as means for unstacking piggy-backed products advancing along the channels. The height restrictors could alternatively be rotatable with flaps or loops aligned with the feed channels and rotated opposite to the advance of products to knock piggy-backed products off lower products.

Flexible flaps extend from the second, discharge end 119 of the feed trough 100 to facilitate transfer of a product from the feed trough to a processing section. In the embodiment of FIGS. 1-4, each feed channel 120 includes two flexible flaps 161, 162. The first flexible flap 161 extends from the lower portion 121b of the first channel wall 121. The second flexible flap 162 extends from the second channel wall 122. The flexible flaps 161, 162 converge towards the bottom to form a slot 170. The second flexible flap 162 of the embodiment of FIGS. 1-4 has a length $L_2$ and a width $W_2$ that are larger than the length $L_1$ and width $W_1$ of the first flexible flap 161.

Referring back to FIGS. 1, 2A and 2B, the flexible flaps 161, 162 contact or come into close proximity with a corresponding processing channel of the processor. As shown in FIG. 2B, the first flexible flap 161 extends substantially vertically downwards, contacting the right outer surface of a corresponding roller 12. The second flexible flap 162 contacts an upper left outer surface of a corresponding roller and extends over the gap 14 between the rollers 12. In the embodiment shown in FIG. 2B, the flexible flaps are tangential to the rollers. Alternatively, the flexible flaps may wrap around the outer surfaces of the rollers. The flexible flaps 161, 162 bridge the space between the discharge end of the feed channels 120 and the rollers 12 or other processing device.

The flexible flaps gently lay an article to be processed, for example a piece of seafood to be graded, directly onto the processing region. The flexible flaps 161, 162 act as shoehorns or a funnel for placing the object in a precise location, such as directly onto a grading roller 12. An object to be processed can push the flexible flaps apart, opening the slot 170 to allow transfer of the object to a processor, such as a grading roller 12.

Preferably, the flexible flaps 161, 162 stick to the rollers 12, which are wet to facilitate grading. When the feed trough 100 vibrates or slides back and forth, the flexible flaps slide back and forth on the rollers, maintaining contact with the rollers. The flexible flaps 161, 162 are preferably sized, positioned and oriented so as to maintain contact with the rollers throughout the motion of the feed trough 100.

The flaps 161, 162 may be formed of any suitable material, such as, but not limited to, plastic, rubber and combinations thereof. In one embodiment, the flexible flaps 161, 162 are formed of 0.125 inch thick silicon rubber. In another embodiment, the flexible flaps 161, 162 are formed of 0.020 inch thick plastic. The material preferably imparts some strength in the longitudinal direction of the flaps, so that the flaps extend from the discharge end of the feed channels without buckling. The flexible flaps 161, 162 may taper in thickness from first ends 1660, 1664 connected to the feed channel outlets to second ends 1662, 1666 that contact the roller.

The flaps 161, 162 may be formed from a single piece of material split to form the two flaps, or may comprise separate pieces separately attached to the base of the feed trough 100. In another embodiment, a single flap base may span multiple channels and have a plurality of flexible flap pairs extending therefrom.

The flexible flaps 161, 162 may be coupled to the discharge end of the feed trough through any suitable means. In the embodiment shown in FIGS. 3 and 4, fasteners 171, illustrated as nuts and bolts, couple the flaps to the channel side walls 121, 122 at the discharge end 119.

The feed trough 100 of FIGS. 3 and 4 is particularly suitable for feeding clams to be sorted by size to a grader. The flexible flaps 161, 162 allow the feed trough 100 to place clams to be graded directly on grading rollers, without dropping a larger distance from the discharge end of the feed trough to the grading roller. The use of two differently sized flaps 161, 162 with different lengths allow the clam to contact and engage a first roller, preferably at an upward rolling portion, then slide down and contact a second roller, preferably at a downward rolling portion of the roller. The illustrative flexible flaps 161, 162 prevent the clam or other object from bouncing and facilitate further processing of the clams.

Figure 5A:
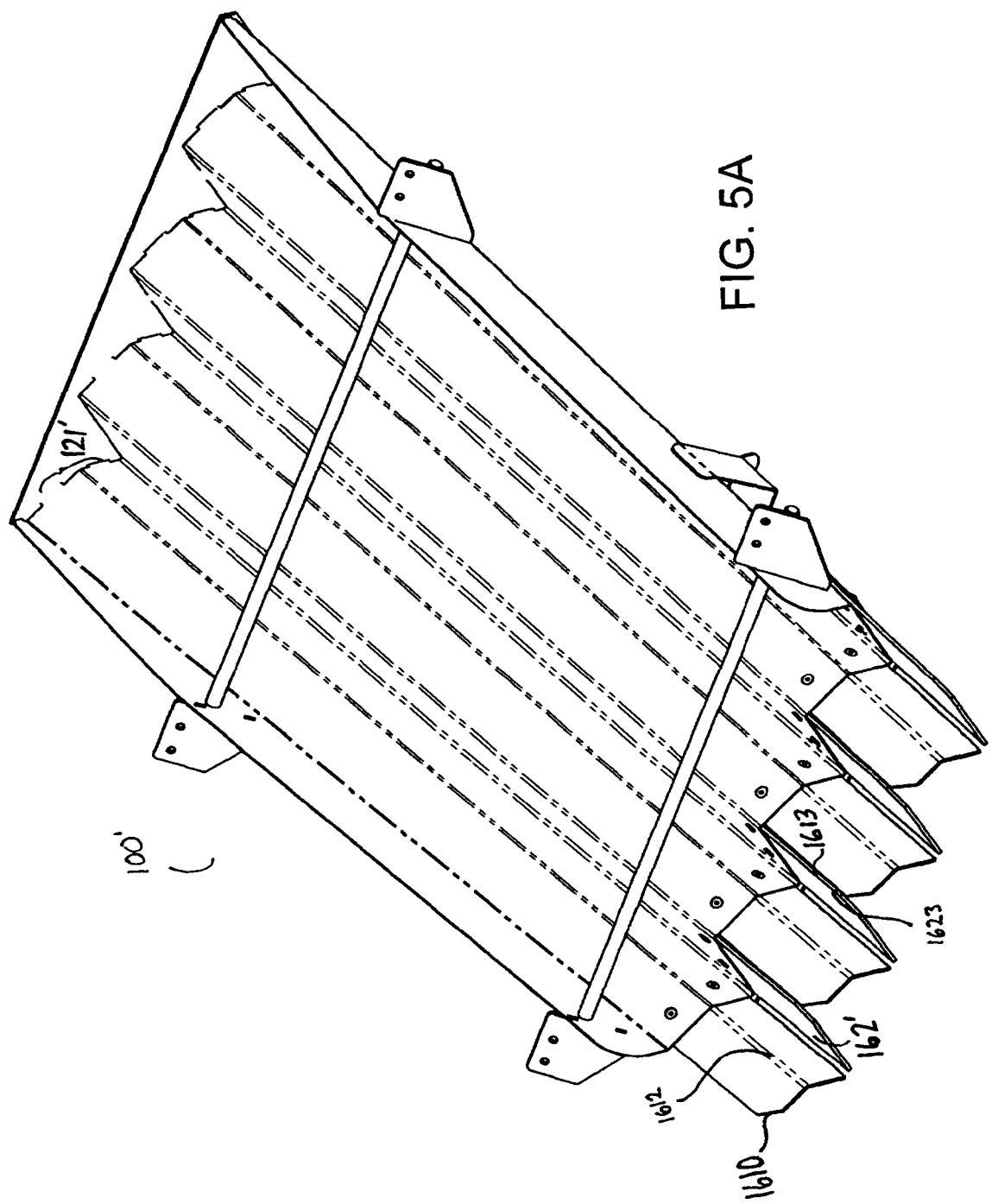
FIG. 5A is an isometric view of a feed trough according to another embodiment of the invention.
Figure 5B:
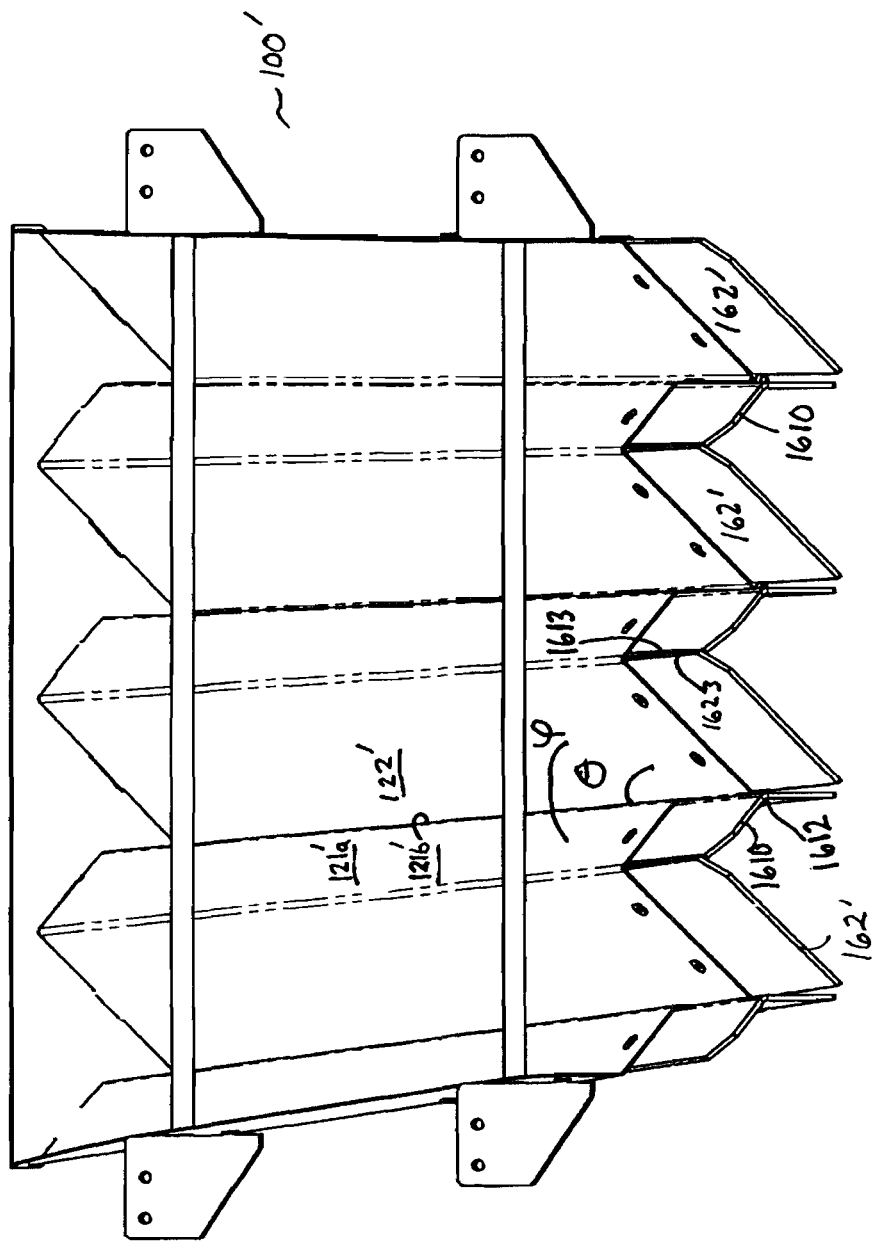
FIG. 5B is a front view of the feed trough of FIG. 5A.
Figure 5C:
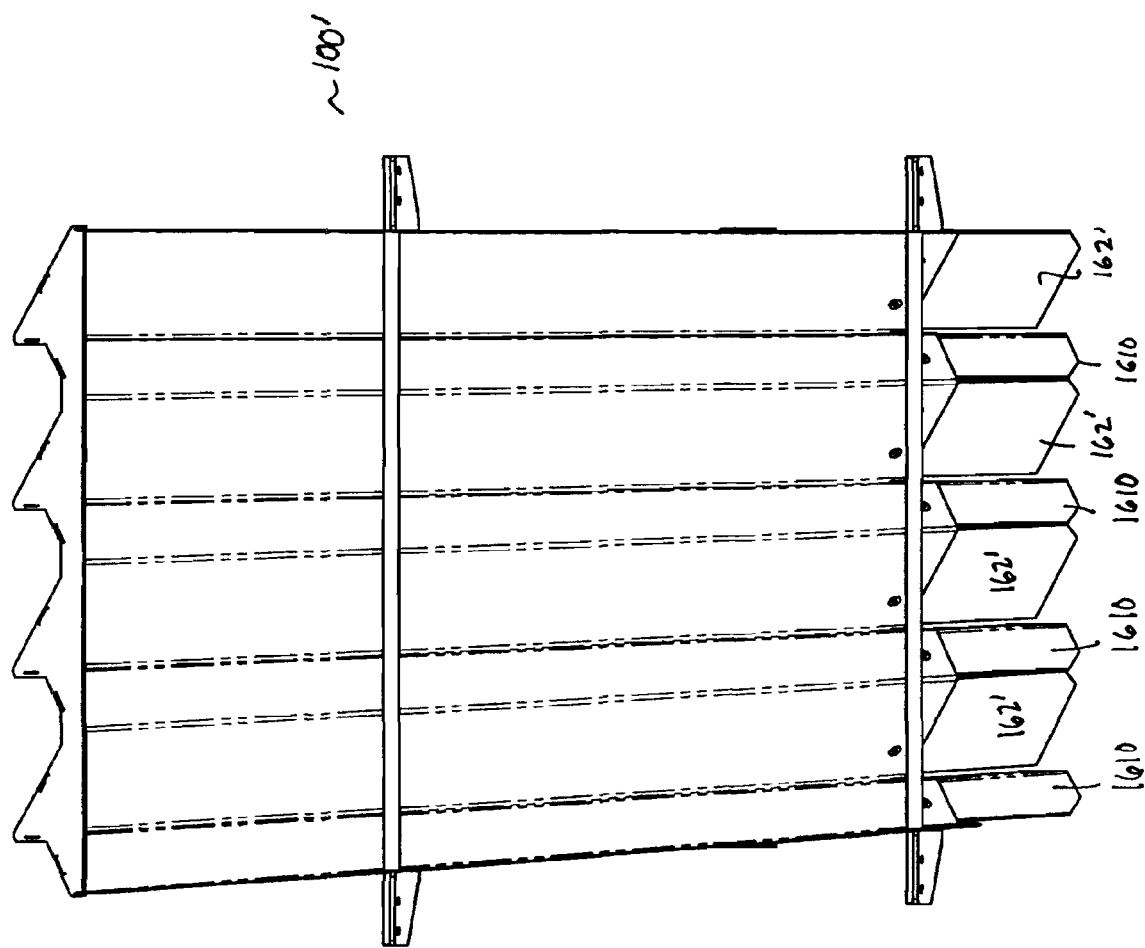
FIG. 5C is a top view of the feed trough of FIG. 5A.
Figure 6:
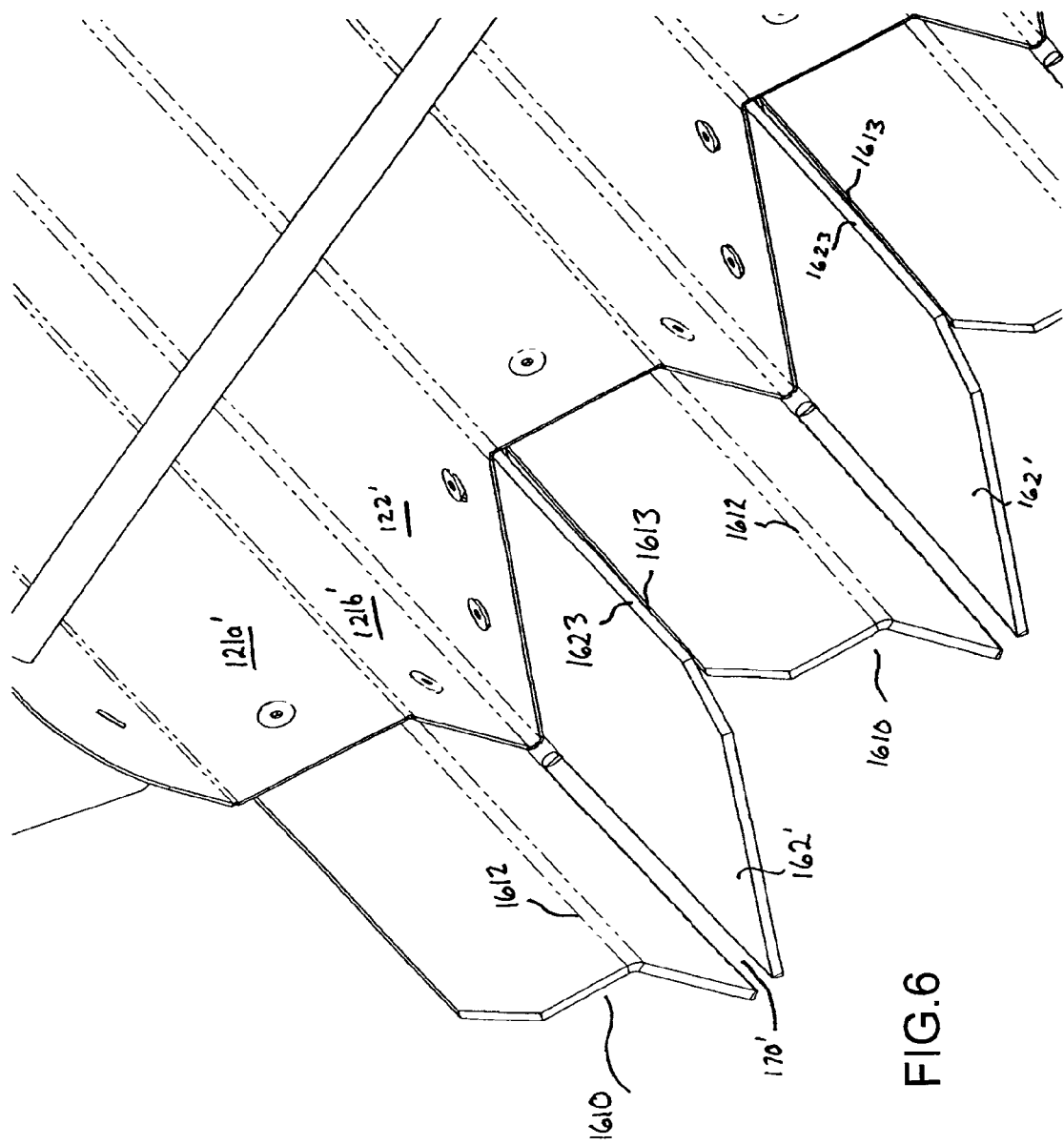
FIG. 6 is a detailed close up view of a discharge end of the feed trough of FIGS. 5A-5C.

FIGS. 5A-C and 6 illustrate another embodiment of a feed trough 100' including flexible flaps 1610, 162' extending from a discharge end to facilitate transfer of a product to a processing region. The feed trough 100' comprises a plurality of feed channels, each comprising a first side wall 121' and a second side wall 122'. The first side wall 121' has an upper portion 121a' and a lower portion 121b' extending at an angle relative to the upper portion. In the embodiment of FIGS. 5A-6, the first flexible flap 1610 includes a bend 1612 that aligns with the entire wall 121' of the feed trough, so that the top edges 1613 and 1623 of the flexible flaps of adjacent channels converge and meet. In the embodiment of FIGS. 5A-C and 6, the first flexible flap 1610 is equal in length to the second flexible flap 162', but the invention is not so limited. The bend 1612 increases the strength and stiffness of the first flexible flap 1610.

The bent first flexible flap 1610 facilitates processing of squid or another delicate object. Squid is difficult to process due to their tentacles, which may get caught, and their delicate nature. The feed trough 100' allows automated grading of squid using a grader, such as the grader 10 of FIG. 1. The feed trough 100' divides a batch of squid into the feed channels and singulates the squid within each channel. The singulated squid pass through the feed channels to a discharge end. The flexible flaps 1610, 1620 at the discharge end gently transfer a squid from a feed channel through the slot 170' and onto a roller or processing region at the same time, preventing tentacles from getting caught and preventing damage to the squid. The squid may then be graded using the rollers 12.

Figure 7A:
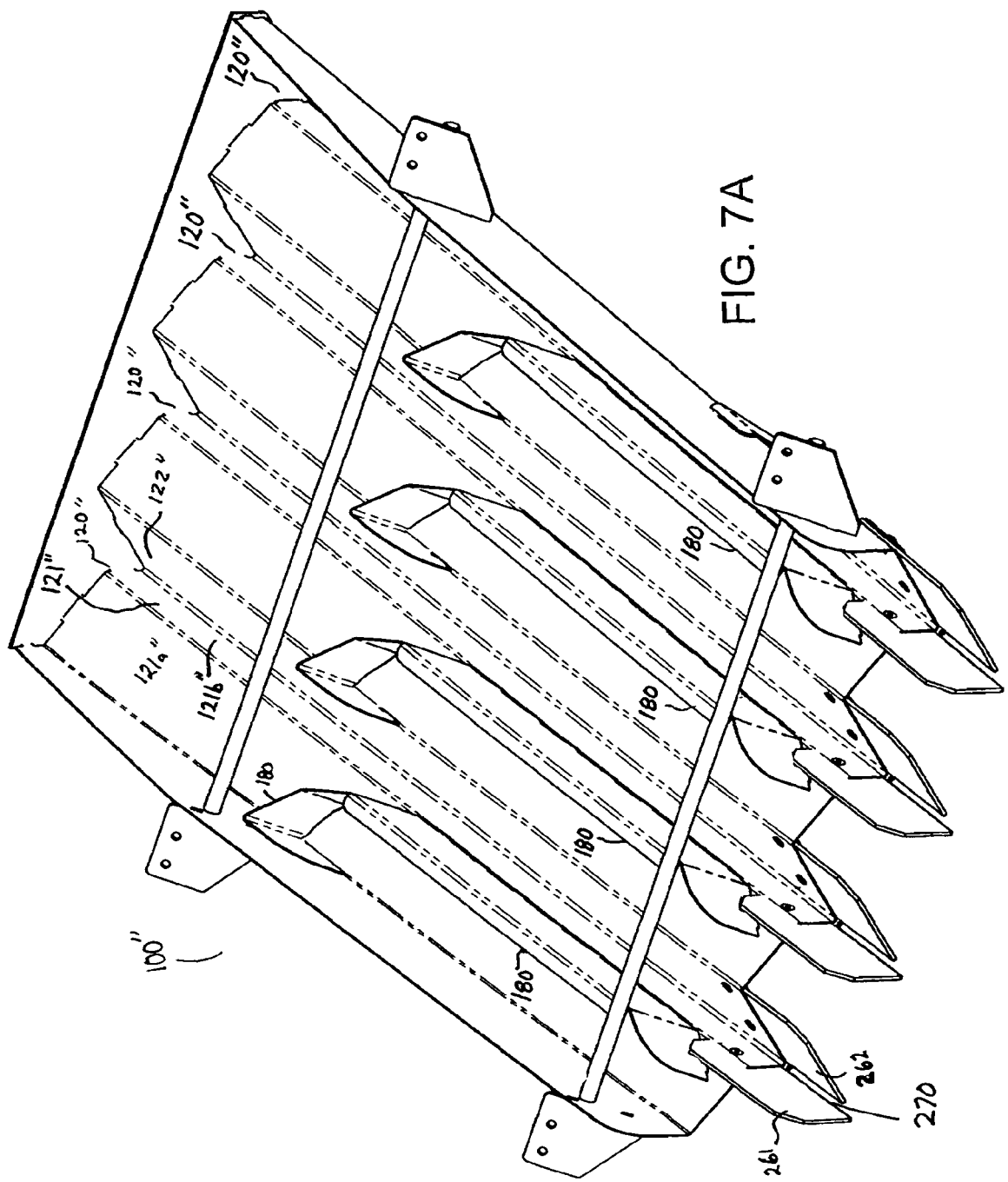
FIG. 7A is an isometric view of a feed trough according to another embodiment of the invention.
Figure 7B:
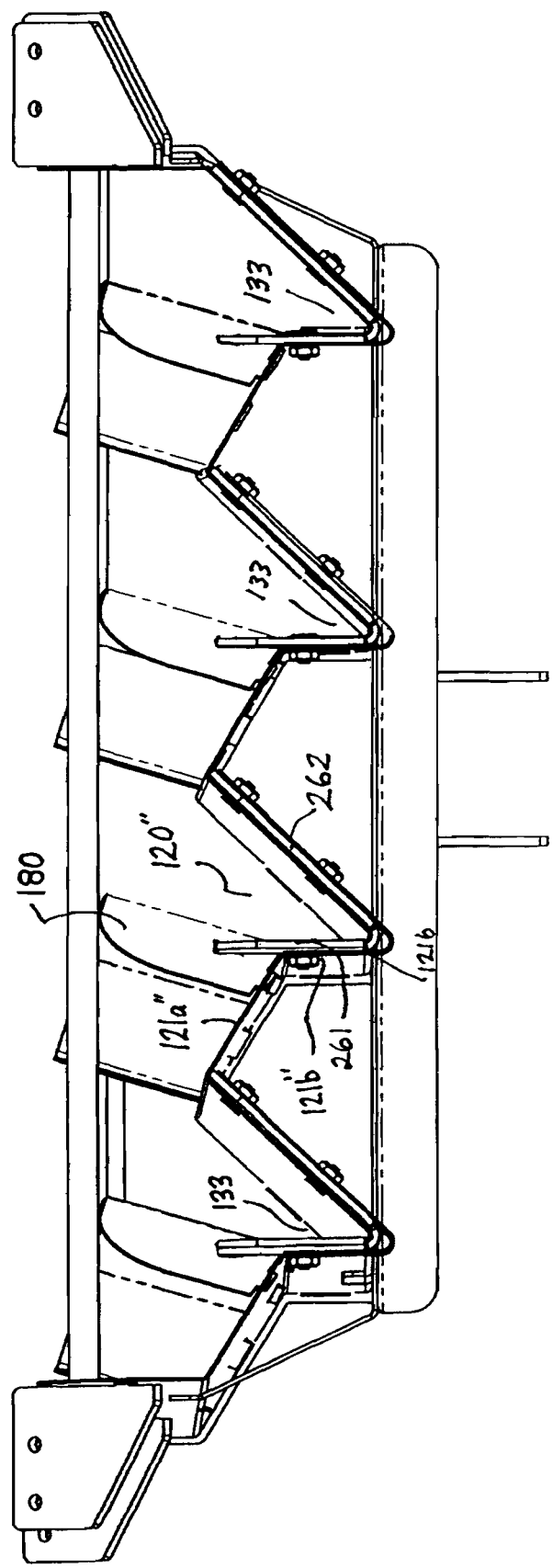
FIG. 7B is a front view of the feed trough of FIG. 7A.

FIGS. 7A, 7B and 8 illustrate another embodiment of a feed trough 100" including flexible flaps to facilitate transfer of a product to a processing region. The feed trough 100" includes a first flexible flap 261 that extends from a lower portion 121b" of a first side wall 121" and a second flexible flap 262 that extends from the second side wall 122" and is similar to the flexible flap 162 of FIG. 3. The first flexible flap 261 extends above the lower portion 121b" of the channel side wall 121", and may extend farther out past the discharge end of the channel than the second flexible flap 262.

The feed trough 100" also includes channel insert 180 in each feel channel 120". The insert 180 is placed in a lower section of the feed channel. As detailed in FIG. 8, the illustrative channel insert 180 includes a first end 181 extending across the top portion 121a" of the channel wall. The first end 181 has a transversely extending portion 181a and an angled portion 181b for pushing product towards the middle of the feed channel. A longitudinally extending central portion 182 extends from the lower portion of the channel wall 121b. The central portion 182 is angled towards the interior of the channel to force product into the slot 133 at the bottom of the channel. The insert further includes an angled second end 183. The insert 180 and feed channel cooperate to singulate product and prevent piggy-backing of the product in the channel.

The feed trough 100" shown in FIGS. 7A, 7B and 8 is particularly suitable for grading shrimp. The vertical first flap 261 cooperates with the second flap 262 to prevent the tail of a shrimp from fanning out. The flexible flaps 261, 262 funnel the tail down through the slot 270 and off the ends of the flexible flaps onto a processing region.

Figure 9A:
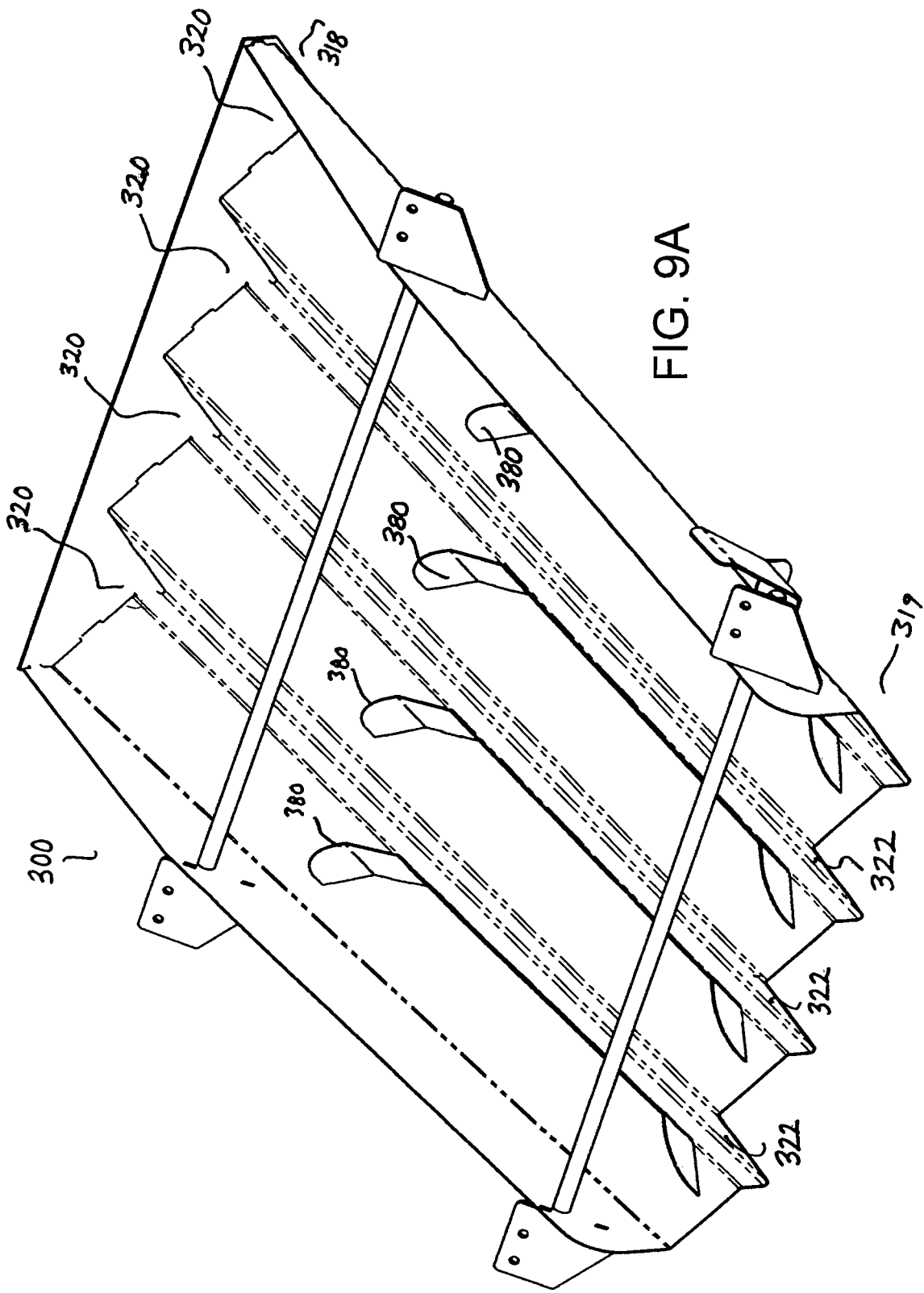
FIG. 9A is an isometric view of a feed trough according to another embodiment of the invention.
Figure 9C:
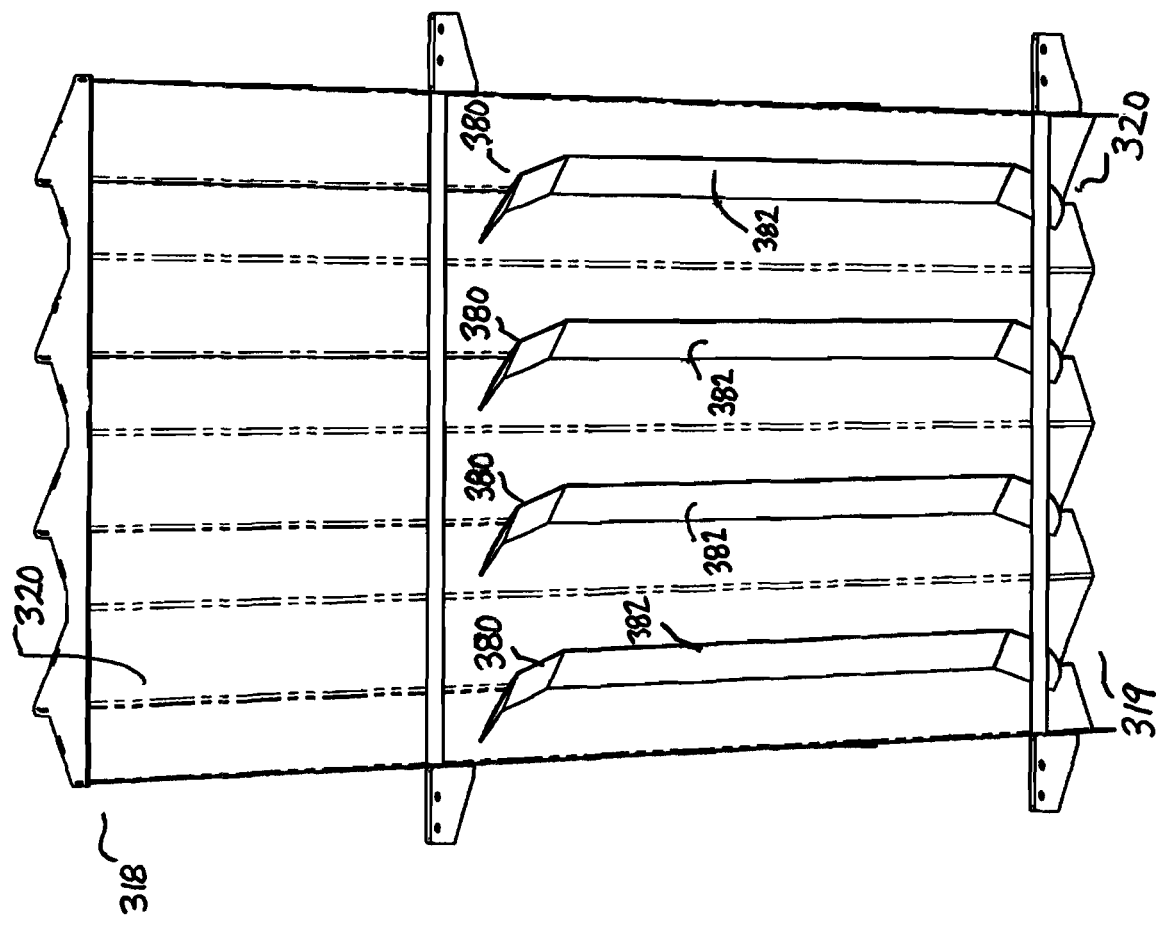
FIG. 9C is a top view of the feed trough of FIG. 9A

FIGS. 9A-9C illustrate a feed trough 300 according to another embodiment of the invention. The feed trough 300 includes a plurality of feed channels 320 having a similar configuration to the feed channels 120 in FIGS. 3 and 4. As shown in FIG. 9B, the feed trough 300 and feed channels 320 narrow from a first end 318 to a discharge end 319. The feed channels include an insert 380 for narrowing the channel towards the discharge end. The insert 380 is similar to insert 280 of FIG. 8, except the central portion 382 is parallel to the channel wall 322. The feed trough 300 may also include flexible flaps (not shown) extending from the discharge ends of the feed channels 320 to facilitate transfer of solid objects from the feed channels to a processing region of a corresponding processor.

Figure 10A:
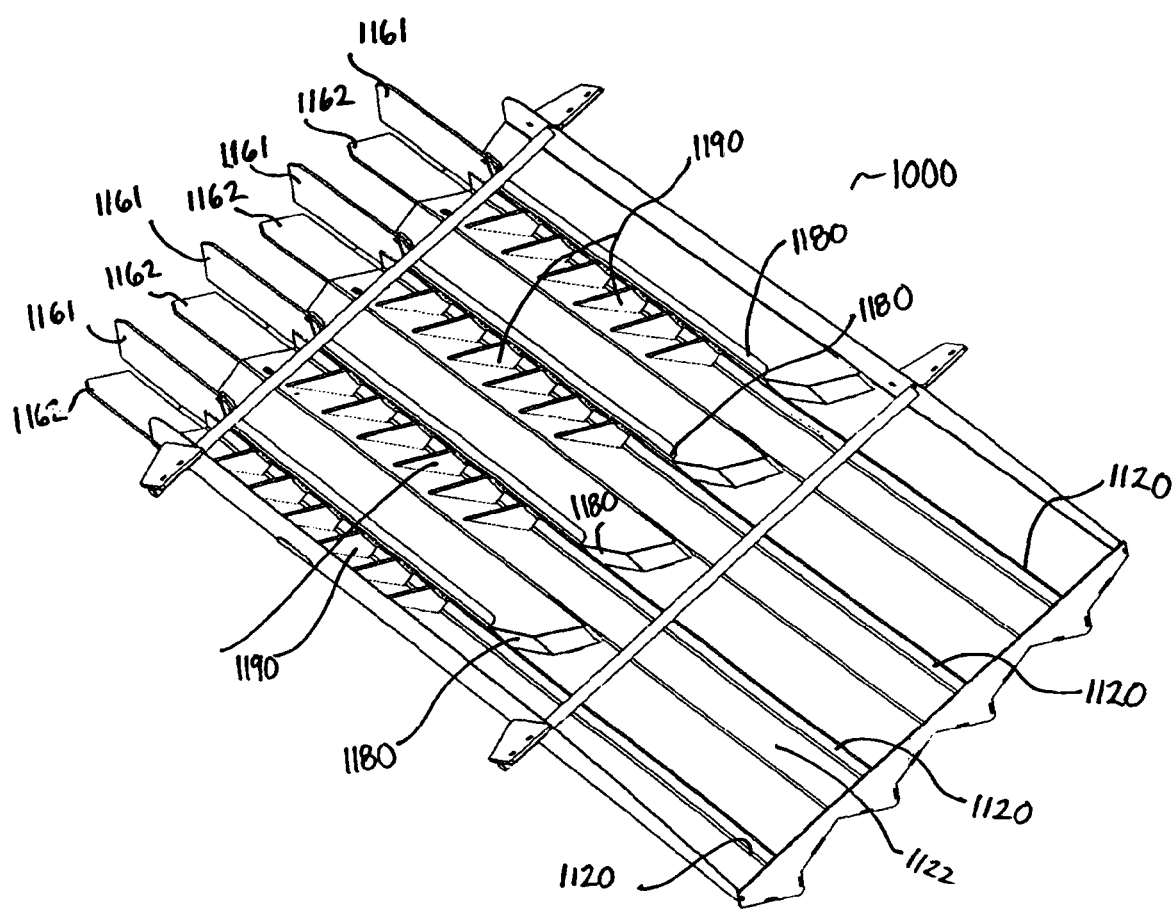
FIG. 10A is a top view of a feed trough including flexible flaps according to another embodiment of the invention.
Figure 10B:
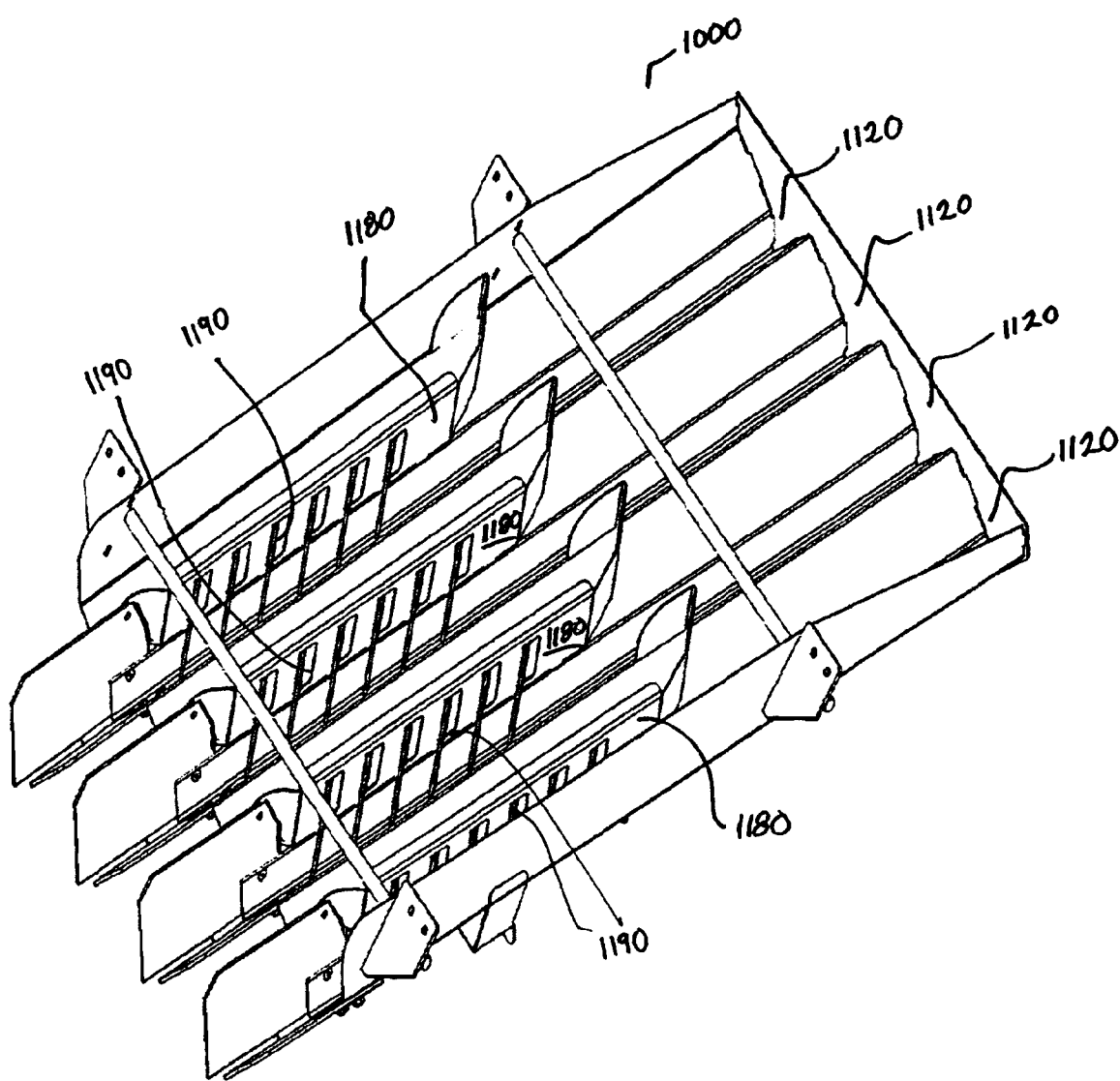
FIG. 10B is another view of the feed trough of FIG. 10A.
Figure 10C:
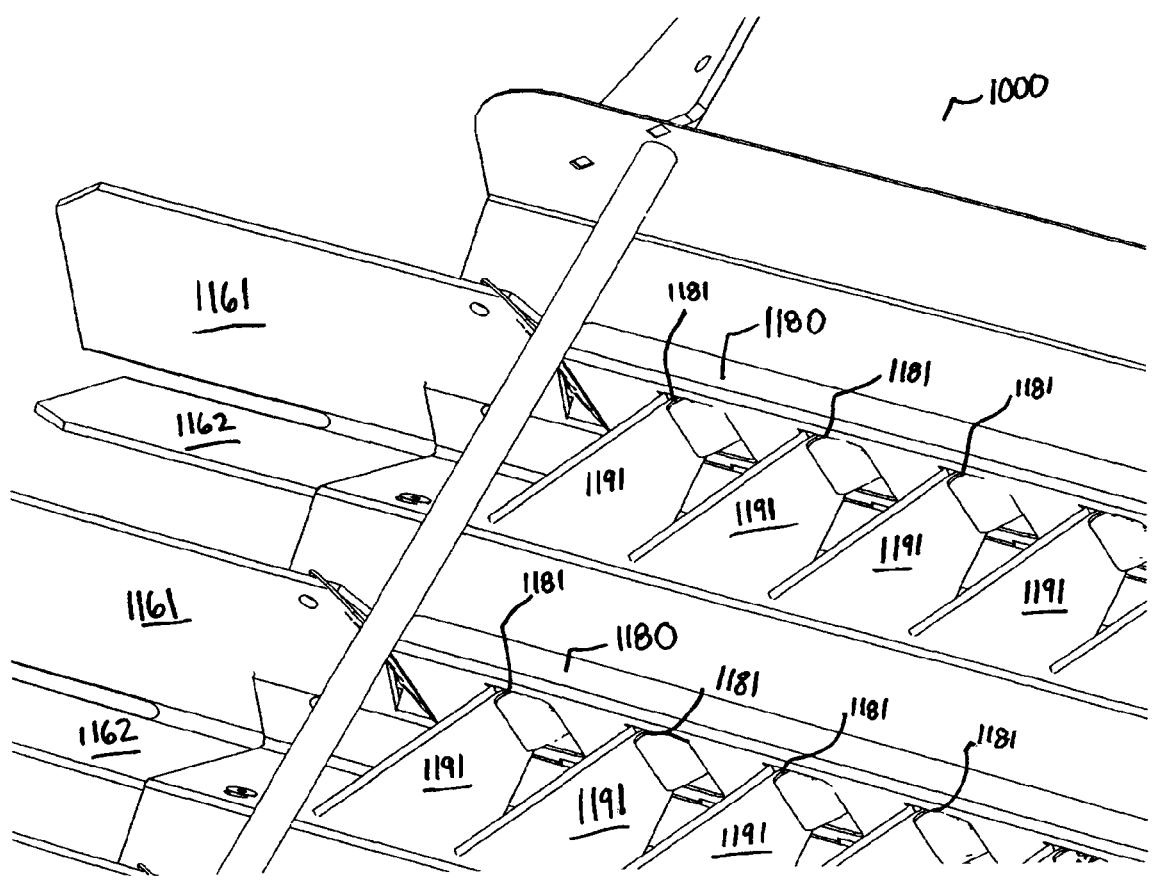
FIG. 10C is a close-up view of the discharge end of the feed trough of FIG. 10A.

FIGS. 10A-10C illustrate another embodiment of a feed trough 1000 including flexible flaps at a discharge end for facilitating the transfer of products onto a processing region. The feed trough 1000 includes a plurality of feed channels 1120 for conveying and-or singulating a product to be processed. The feed trough includes a plurality of flexible flaps 1161, 1162 at the discharge end of each channel. The flexible flaps 1161, 1162 cooperate to facilitate the transfer of products from the trough. One or more channels includes an insert 1180 for narrowing the channel, similar to the insert 180 described above. One or more channels may further include a valving device 1190. The illustrative valving device 1190 comprises a plurality of check valves or gills extending at an angle from the insert 1180. The check valves extend across the feed channel, sloping towards the discharge end. The check valves are formed of a flexible material, such as rubber or plastic. The valving device increases throughput and reduces piggy-backing of the product by holding back doubled up products and forcing the products into a single file through the channel and into the discharge area. The illustrative check valves of the valving device 1190 are triangular in shape and may extend from a base that overlies the sidewall 1122 of the channel into windows 1181 in the insert 1180. Other suitable means for singulating products in a channel may be used.

According to one embodiment of the invention, a plurality of cascading feed troughs, at least one of which has flexible flaps for facilitating discharge of product from the feed trough, may be used at an infeed end of a processor.

The flexible flaps may have any suitable size, shape, orientation, configuration and location, and are not limited to the illustrative embodiments described above.

Although the invention has been described in detail with reference to a few exemplary versions, other versions are possible. For example, more than four feed channels could be used to increase capacity. The feed channels can have various sizes, shapes, orientations and configurations. The flexible flaps may also have various sizes, shapes, materials, orientations and configurations, depending on the particular product or processing application. So, as these few examples suggest, the scope of the claims is not meant to be limited to the versions described in detail.

What is claimed is:

1. A feed trough for a processor comprising:
    a base forming a plurality of feed channels, each feed channel extending from a first end to a second end;
    a first flexible flap extending from a channel wall at the second end of a feed channel, and
    a second flexible flap extending from the second end of the feed channel, wherein lower edges of the first flexible flap and second flexible flap converge.

2. The feed trough of claim 1, wherein the second flexible flap is longer and wider than the first flexible flap.

3. The feed trough of claim 2, wherein the first flexible flap extends from a first side wall of the feed channel and the second flexible flap extends from a second side wall of the feed channel.

4. The feed trough of claim 1, wherein the lower edges form a slot extending between the lower edges of the first flexible flap and the second flexible flap.

5. The feed trough of claim 1, wherein the first flexible flap comprises two planar portions that intersect at an angle.

6. The feed trough of claim 1, wherein the first flexible flap aligns with a side wall of the feed channel.

7. The feed trough of claim 1, wherein the first flexible flap is formed of rubber or plastic.

8. The feed trough of claim 1, wherein the feed channel further includes an insert for narrowing the feed channel, the insert placed between the second end and an intermediate portion of the feed channel.

9. The feed trough of claim 1, wherein the feed channel includes a valving device for singulating product in the feed channel.

10. The feed trough of claim 1, wherein each feed channel in the base includes two converging, flexible flaps extending from a second end thereof.

11. A processor for solid objects, comprising:
    a feed trough comprising a plurality of feed channels extending from a first end to a second end and a pair of converging, flexible flaps extending from the second end of at least one feed channel;
    a processing section extending in length from an infeed end to an opposite end and in width from a first side to a second side and including plurality of processing channels extending from the infeed end to the opposite end, wherein at least one flexible flap contacts a processing channel at an infeed end.

12. The processor of claim 11, wherein each processing channel is formed by a plurality of rollers.

13. The processor of claim 11, wherein each feed channel aligns with a processing channel.

14. The processor of claim 13, wherein each feed channel includes a pair of converging, flexible flaps extending between the second end of the feed channel and an aligned processing channel.

15. The feed trough of claim 1, further comprising a fastener extending through the channel wall for fastening an end of the flexible flap to the channel wall.

* * * * *